United States Patent Office 2,958,607
Patented Nov. 1, 1960

2,958,607

WATER-SOLUBLE THERMOPLASTIC CELLULOSE ETHER COMPOSITIONS AND FILMS PREPARED THEREFROM

Francis E. Windover, Samuel M. Rodgers, Jr., and Garth H. Beaver, Midland, Mich., assignors to The Dow Chemical Company, Midland, Mich., a corporation of Delaware No Drawing. Filed Jan. 23, 1958, Ser. No. 710,626

13 Claims. (Cl. 106—180)

This invention relates to improved water-soluble thermoplastic compositions based on certain cellulose ethers. More particularly it relates to such compositions comprising hydroxyalkyl alkyl cellulose ethers and certain plasticizers. The invention further contemplates films, sheets, foils, and the like as well as coatings for cellulosic or similar substrata which articles have been prepared from said compositions.

A method for the fabrication by thermal means, such as extrusion, of flexible and of rigid articles, such as films and sheets from water-soluble cellulose ethers has long been desired. It has also been desired to have thermoplastic compositions based on water-soluble cellulose ethers which could be formed by conventional methods into heat-sealable films and sheets. Heat sealability would allow for expanded exploitation of such cellulose ether films and sheets into areas of the packaging field from which such films and sheets have been heretofore barred. Themoplastic compositions made from non-thermoplastic, water-soluble cellulose ethers have been disclosed, but they usually require such large amounts of plasticizer that rigid articles cannot be produced except by forming very thick sections. When either films or sheets were desired, it was necessary to cast or to dip the ethers from an aqueous solution, usually containing a small amount of a humectant, and subsequently to evaporate the water. Because of the unique solubility characteristics of most of the cellulose ethers in water, the fabrication of shaped articles from aqueous solutions is very difficult to control. It would be desirable if existing thermal fabricating equipment and methods as well as conventional casting techniques could be employed to form such articles. It would also be desirable if films and sheets of hydroxyalkyl alkyl cellulose ethers could be heat sealed with existing apparatus.

Any water-soluble thermoplastic cellulose ether composition entails many more considerations than the thermoplasticity and heat sealability mentioned above. Any plasticizer must satisfy all of the requirements of such an agent in being compatible with and chemically inert to all ingredients of the composition. It must have optimum plasticizing effectiveness at the temperatures of fabrication and use. It should be colorless, odorless, tasteless, and non-toxic. These and other known requirements preclude the predictability of the successful function of any given compound as a plasticizer in the above type of composition.

In view of the above requirements and considerations it is the principal object of this invention to provide improved plasticized hydroxyalkyl alkyl cellulose ether compositions.

It is a further object to provide such compositions which following fabrication are water-soluble and thermoplastic.

Another object is the provision of a water-soluble thermoplastic film based on a cellulose ether.

Still another object is the provision of such a film which can be heat sealed.

The above and related objects are accomplished by using compositions consisting essentially of certain water-soluble thermoplastic hydroxyalkyl alkyl cellulose ethers as will be further described and plasticizing amounts of an acetate of glycerine. The objects are further realized with films prepared from said compositions.

The cellulose ethers which are useful in carrying out the invention are those hydroxyalkyl alkyl cellulose ethers in which the hydroxyalkyl groups have from 2 to 4 carbon atoms, the alkyl groups have from 1 to 3 carbon atoms, and which melt at a temperature appreciably below their decomposition temperature, and which are soluble in water and certain organic solvents. Typical examples of useful ethers are the hydroxyethyl methyl and hydroxypropyl methyl ethers of cellulose when etherified to an extent as will be described. Those two ethers are commercially available materials, are inexpensive, have unusually good properties and are accordingly preferred.

Cellulose ethers satisfying the above specifications may be prepared by processes as described in the copending applications of Albert B. Savage, U.S. Serial Nos. 432,-921, now Patent No. 2,831,852, and 432,922, now Patent No. 2,835,666, filed of even date of May 27, 1954. In those applications it is taught that the ethers may be prepared by known two-step processes, but that a one-step process is preferred. In an illustrative example of such a process, cellulose is treated with from 30 to 60 percent aqueous caustic soda solution to give an alkali cellulose with a ratio of from about 0.7 to about 1.5 parts by weight of NaOH per part of cellulose. The alkali cellulose is then mixed with from about 1.1 to about 2.0 parts of methyl chloride per part of cellulose and with about 0.45 to 0.50 part of propylene oxide, or its molar equivalent of ethylene oxide, per part of cellulose at a temperature below 40° C. for a short time, followed by reaction at 60° C. or higher until etherification is substantially complete. The product is washed with hot water at a temperature above its aqueous gel point to remove water-soluble impurities.

Although it is difficult to determine the proportions and amounts of each substituent in a mixed cellulose ether and especially when that ether has been prepared by a single step process, it has been found that the cellulose ethers useful in this invention should have from about 7 to about 10 percent hydroxypropoxy substitution or the corresponding equivalent substitution for hydroxyethoxy or hydroxybutoxy, although slightly less hydroxybutoxy substitution of down to about 4 percent may be tolerated and from about 28 to about 30 percent methoxy, or the corresponding equivalent substitution of ethoxy or propoxy. It is common practice to characterize the ethers by their chemical and physical properties, such as melting point of the ether or gel point of its water solutions. In the case of this invention the existence of the desired degree of etherification is most conveniently determined by measuring the softening, melting and decomposition temperatures of the cellulose ether product. Those temperatures are easily determined by using a melting bar which has progressively increasing temperatures along its length. Films of constant thickness are made and small pieces placed at various points along the bar. To be useful here, the mixed ethers should have a spread of at least 10 and preferably 20 or more centigrade degrees between melting and decomposition temperatures.

The useful cellulose ethers are also found to have gel points in water that are between those of the alkyl celluloses of commerce and the corresponding commercial hydroxyalkyl alkyl celluloses. For example the methyl celluloses of commerce have aqueous gel points of from about 45 to 50° C.; the commercial hydroxypropyl methyl celluloses have aqueous gel points above about 65° C.; and the hydroxypropyl methyl cellulose ethers of this invention have gel points of about 55° C. The ethyl, propyl, and butyl derivatives show similar differences in gel points in aqueous solution.

The essential plasticizers in the compositions of this invention are the acetates of glycerol. It is possible to use the mono-, di-, or tri-esterified glycerols or mixtures of those esters with about equally successful results. Such esters are commercially available compounds.

The amount of cellulose ether that may be used in the thermoplastic compositions of this invention may be varied within wide limits. The actual concentration to be used will be dependent upon the properties desired in the finished article, on the method of fabrication, and on the viscosity grade of the cellulose ether used. To a lesser degree the choice of the mono-, di-, or tri-substituted ester will affect the concentration. For compression molding, vacuum drawing, extrusion and like operations to prepare relatively thick sections and where flexibility is of little importance it is possible to use as little as about 5 percent by weight of the plasticizer. However, when thin, flexible films are to be prepared it has been found that there may be used from about 10 to about 50 percent by weight of plasticizer based on the combined weight of cellulose ether and plasticizer. Optimum results are attained when the glycerol acetate plasticizer is used in a concentration of from about 20 to about 30 percent by weight and this range is accordingly preferred. The properties of films prepared from compositions containing greater than about 50 percent by weight of plasticizer are so poor, especially in tensile strength and and moisture vapor transmission, as to preclude commercial acceptance.

When the thermoplastic ethers of this invention are used, smaller amounts of plasticizer are required to give a moldable composition than when non-thermoplastic ethers are used. It is also possible to prepare moldable compositions with but a single plasticizer, rather than requiring complex mixtures of plasticizers as are needed with the non-thermoplastic cellulose ethers. It should be understood, however, that mixtures of plasticizers may be employed, if desired for special effects with these thermoplastic cellulose ethers. Thus the ester plasticizers of this invention may conveniently be used in combination with glycerine and propylene glycol for practical reasons without losing the desired properties. When combinations of plasticizer are used, the concentration of combined plasticizer should be present in a concentration of from about 10 to about 50 percent by weight of the combined weight of said plasticizer and cellulose ether. Of the total weight of the composition there must be at least 5 percent by weight of the glycerol acetate plasticizer. If less than that amount of the desired glycerol acetate is present the desirable heat sealing and adhesive properties will be significantly reduced.

The plasticizers of this invention, in addition to providing excellent plasticization efficiency, are noteworthy in being substantially tasteless, odorless, and in exhibiting no serious toxic effects resulting from ingestion. The lack of these properties alone has eliminated many of the prior compositions from being accepted by the food packaging industry.

In addition the films prepared from the compositions of this invention are singularly outstanding in a capability of being heat sealed in conventional equipment such as bar type heat sealers. This capability allows the films to enter those fields where hermetically sealed closures without foreign adhesives and the like are mandatory.

The compositions of this invention may be thermally fabricated by extrusion, molding, and similar operations into clear, transparent, water-soluble films. In certain instances as where a water insoluble secondary plasticizer such as tributyl citrate is used, it is of considerable advantage to use thermal fabrication means, since casting from aqueous solutions results in films of hazy appearance. Even those hazy films have the required heat sealing properties however. Such films may also be prepared by casting a solution of the composition in water, water and methanol, or benzene and methanol with or without a small amount of water. In all instances the films are heat sealable.

The advantages of these compositions and films will be more apparent from the following illustrative examples wherein all parts and percentages are by weight unless otherwise indicated.

EXAMPLE I

Several compositions were prepared based upon a hydroxypropyl methyl cellulose containing from 7 to 10 percent hydroxypropoxy substitution and from 28 to 30 percent methoxyl substitution. Various single plasticizers and mixtures of plasticizers were blended with the cellulose ethers. Solutions of the compositions in an 80 percent methanol-20 percent water solvent were prepared. Films were cast on glass plates, dried, and stripped therefrom. The tensile strength and elongation of the dried films were determined. In each case the resulting film was transparent, thermoplastic, and water soluble and clear except for sample No. 5 containing 10 percent of tributyl citrate which resulted in a hazy film. The results are listed in Table I.

*Table I*

COMPOSITION (PERCENT OF COMBINED WEIGHT OF ETHER AND PLASTICIZER)

| Sample No. | Glycerol Diacetate | Propylene Glycol | Glycerine | Tributyl Citrate | Hydroxy-propyl Glycerol | Tensile Strength, lbs./in.$^2$ | Elongation, Percent |
|---|---|---|---|---|---|---|---|
| 1 | 30 | | | | | 3,300 | 50 |
| 2 | 40 | | | | | 840 | 87 |
| 3 | 20 | 20 | | | | 1,770 | 43 |
| 4 | 10 | | | 20 | | 2,793 | 59.5 |
| 5 | 10 | | 10 | 10 | | 2,303 | 74.5 |
| For Comparison: | | | | | | | |
| 6 | | | | | 30 | 2,474 | 47.0 |

The results show that in the properties of tensile strength and elongation which are critical to successful packaging, the compositions containing glycerol diacetate compare favorably with sample number 6 containing a known plasticizer for such cellulose ethers. In addition samples 1–4 were substantially tasteless and odorless whereas sample 5 and comparative sample number 6 had a disagreeable bitter taste and could not be acceptable for foods uses.

EXAMPLE II

Several compositions were prepared from the cellulose ether described in Example I and various plasticizers and mixtures of plasticizers. Films were cast from methanol-water solution on glass plates, dried, and stripped. In all cases the films were transparent, and water soluble and clear except for the samples containing tributyl citrate which were hazy. Their ability to heat seal was determined with a bar type sealer with the results listed in Table II. A temperature above 200° C. would be considered so high as to be commercially unacceptable.

Table II

| Sample No. | Glycerol Diacetate | Glycerol Triacetate | Glycerine | Propylene Glycol | Tributyl Citrate | Heat Sealing Temperature (° C.) |
|---|---|---|---|---|---|---|
| 7 | 30 | | | | | 170. |
| 8 | | 30 | | | | 200. |
| 9 | 15 | | | | | 180. |
| 10 | 15 | | | 15 | | 160. |
| 11 | 10 | | 15 | | | 180. |
| 12 | 10 | | 10 | 10 | | 170. |
| 13 | 10 | | 20 | | | 170. |
| 14 | 5 | | 25 | | | 150. |
| 15 | 10 | | 10 | | 10 | 180. |
| 16 | 15 | | | | 15 | 180. |
| 17 | 20 | | | | 10 | 200. |
| For Comparison: | 10 | | | | 20 | |
| 18 | 30% hydroxypropyl glycerol | | | | | 170. |
| 19 | 30% acetyl tributyl citrate | | | | | 200. |
| 20 | 30% glycerine | | | | | Could not be heat sealed. |

The results show that compositions containing glycerol acetates as plasticizers alone or in combination with other plasticizers give films that are heat sealable with equal facility to those from compositions containing known plasticizers. The composition containing only glycerine could not be heat sealed. In addition compositions 7–13 were tasteless and odorless whereas control samples 18–19 had a disagreeable bitter taste.

EXAMPLE III

A composition was prepared from a hydroxybutyl methyl cellulose containing 4 to 8 percent of hydroxybutoxy substitution and about 28 percent of methoxy substitution. Blended with that ether was 5 percent of glycerol diacetate and 25 percent of glycerine. A film was cast from methanol water solution on a glass plate, dried, and stripped. The film was clear, transparent, and water soluble. When tested as in Example II for heat sealability it was found to heat seal at 190° C.

When glycerol monoacetate is employed in place of either the di- or tri-acetate in the compositions of Examples I–III similar results are noticed.

What is claimed is:
1. A thermoplastic composition consisting essentially of from 50–95 percent by weight of a water soluble, thermoplastic hydroxyalkyl alkyl cellulose ether in which the hydroxyalkyl group contains from 2 to 4 carbon atoms, the alkyl group contains from 1 to 3 carbon atoms, and which has a melting point which is at least 10 degrees centigrade below the decomposition temperature and correspondingly from about 50 to 5 percent by weight of a plasticizer, wherein said composition contains essentially as said plasticizer from at least 5 to not over 40 percent by weight of a glycerol acetate selected from the class consisting of the mono-, di-, and tri-acetates of glycerol.

2. The composition claimed in claim 1 wherein said hydroxyalkyl alkyl cellulose ether is a hydroxypropyl methyl cellulose containing from 7 to 10 percent hydroxypropoxy substituents and from 28 to 30 percent of methoxy substituents.

3. A thermoplastic composition as claimed in claim 1 wherein said plasticizer consists solely of from 5 to 40 percent by weight of a glycerol acetate selected from the class consisting of the mono-, di- and tri-acetates of glycerol.

4. A thermoplastic composition as claimed in claim 3 wherein said plasticizer is present in a concentration of from 20 to 30 percent by weight.

5. A thermoplastic composition as claimed in claim 1 wherein said plasticizer consists of a glycerol acetate selected from the class consisting of mono-, di-, and tri-acetates of glycerol and a secondary plasticizer.

6. A thermoplastic composition as claimed in claim 5 wherein said secondary plasticizer is glycerine.

7. A thermoplastic composition as claimed in claim 5 wherein said secondary plasticizer is propylene glycol.

8. A thermoplastic composition as claimed in claim 5 wherein said secondary plasticizer is a mixture of propylene glycol and glycerine.

9. A thermoplastic composition as claimed in claim 5 wherein said secondary plasticizer is tributyl citrate.

10. A water-soluble, heat-sealable, transparent film of a composition consisting essentially of from 50 to 95 percent by weight of a water-soluble, thermoplastic hydroxyalkyl alkyl cellulose ether in which the hydroxyalkyl group contains from 2 to 4 carbon atoms, the alkyl group contains from 1 to 3 carbon atoms and which has a melting point below the decomposition temperature and correspondingly from 50 to 5 percent by weight of a plasticizer, and wherein said composition contains essentially from 5 to 40 percent by weight of a glycerol acetate selected from the class consisting of the mono-, di-, and tri-acetates of glycerol as said plasticizer.

11. The film claimed in claim 10 wherein said cellulose ether is hydroxypropyl methyl cellulose containing from 7 to 10 percent hydroxypropoxy substituents and from 28 to 30 percent methoxy substituents.

12. The film claimed in claim 10 wherein said plasticizer consists solely of from 5 to 40 percent by weight of a glycerol acetate selected from the group consisting of the mono-, di-, and tri-acetates of glycerol.

13. The film claimed in claim 10 wherein said plasticizer consists of the said glycerol acetate and a secondary plasticizer.

References Cited in the file of this patent

UNITED STATES PATENTS

| 2,771,377 | Greminger et al. | Nov. 20, 1956 |
| 2,839,419 | Windover et al. | June 17, 1958 |

OTHER REFERENCES

Sidmonds et al.: Handbook of Plastics, 1943, page 262.
Buttrey: "Plasticizers," Interscience Publishers, Inc. (1950), pages 44–46.